United States Patent [19]

Kanome et al.

[11] Patent Number: 5,320,514
[45] Date of Patent: Jun. 14, 1994

[54] ROLL STAMPER, AND APPARATUS AND PROCESS FOR MANUFACTURING SUBSTRATE SHEET FOR INFORMATION RECORDING MEDIUMS BY USING THE SAME

[75] Inventors: Osamu Kanome; Hirofumi Kamitakahara; Naoki Kushida, all of Yokohama; Hitoshi Yoshino, Zama; Toshiya Yuasa, Kawasaki; Takashi Kai, Hadano; Hisanori Hayashi, Tsukuba, all of Japan

[73] Assignee: Canon Kabushiki Kaisha, Tokyo, Japan

[21] Appl. No.: 963,731

[22] Filed: Oct. 20, 1992

[30] Foreign Application Priority Data

Oct. 22, 1991 [JP] Japan .................... 3-301314

[51] Int. Cl.$^5$ .................... B29C 59/00
[52] U.S. Cl. .................... 425/194; 264/1.3; 264/1.6; 264/106; 425/363; 425/385; 425/810
[58] Field of Search .................... 264/1.3, 1.6, 106, 107; 425/194, 363, 367, 369, 374, 385, 810

[56] References Cited

U.S. PATENT DOCUMENTS

| | | |
|---|---|---|
| 1,466,733 | 9/1923 | Sulzer et al. |
| 2,106,245 | 1/1938 | Finch .................... 101/32 |
| 2,529,083 | 11/1950 | Keefe . |
| 2,834,985 | 5/1958 | Moog . |
| 3,072,519 | 1/1963 | Salzman .................... 156/200 |
| 3,387,330 | 6/1968 | Lemelson . |
| 3,768,946 | 10/1973 | Matuschke .................... 425/363 |
| 3,874,836 | 4/1975 | Johnson et al. .................... 425/363 |
| 3,893,795 | 7/1975 | Nauta .................... 425/403 |
| 4,047,481 | 9/1977 | Saunders .................... 101/376 |
| 4,211,743 | 7/1980 | Nauta et al. .................... 264/284 |
| 4,746,220 | 5/1988 | Sukai et al. .................... 366/79 |
| 4,790,893 | 12/1988 | Watkins .................... 156/232 |
| 4,836,874 | 6/1989 | Foster .................... 156/209 |
| 5,048,745 | 9/1991 | Sato et al. .................... 228/132 |
| 5,173,313 | 12/1992 | Sato et al. .................... 425/194 |

FOREIGN PATENT DOCUMENTS

| | | |
|---|---|---|
| 0405582 | 1/1991 | European Pat. Off. . |
| 0405898 | 1/1991 | European Pat. Off. . |
| 0408283 | 1/1991 | European Pat. Off. . |
| 0507600 | 10/1992 | European Pat. Off. . |
| 3-97909 | 4/1991 | Japan . |
| 4-307223 | 10/1992 | Japan .................... 425/385 |
| 457604 | 3/1975 | U.S.S.R. . |

Primary Examiner—Charles S. Bushey
Attorney, Agent, or Firm—Fitzpatrick, Cella, Harper & Scinto

[57] ABSTRACT

A roll stamper for forming a substrate sheet for information recording mediums has a flexible stamper member having a pattern corresponding to a preformat for an information recording medium; a first fixing member and a second fixing member respectively joined to both ends of the stamper member in an integral form; and a pair of fit grooves capable of fittingly receiving the fixing members, formed in the periphery of a specular roll substrate in parallel to the axial direction of the specular roll substrate. The fixing members are so fitted to the fit grooves that the stamper member is fixed along the periphery of the specular roll substrate between the fit grooves.

The first fixing member has a first member showing a coefficient of linear expansion substantially equal to the coefficient of linear expansion of the stamper member and a second member having a larger coefficient of linear expansion than the coefficient of linear expansion of the first member. The first member is joined to the stamper member and the second member is positioned inside the first member with respect to the second fixing member. The roll stamper is so set up as to satisfy the relationship of expression (1):

$$\Delta L_1 - \Delta L_2 < \Delta L_{3a} \tag{1}$$

28 Claims, 6 Drawing Sheets

ROLL STAMPER, AND APPARATUS AND PROCESS FOR MANUFACTURING SUBSTRATE SHEET FOR INFORMATION RECORDING MEDIUMS BY USING THE SAME

BACKGROUND OF THE INVENTION

1. Field of the Invention

The present invention relates to a roll stamper used when a substrate sheet for high-density information recording mediums such as optical disks and optical cards is produced by continuously transferring preformat patterns to the surface of a resin sheet. It also relates to an apparatus and a process for manufacturing a substrate sheet for information recording mediums by using the stamper.

2. Related Background Art

Processes for manufacturing substrates for high-density information recording mediums such as optical disks and optical cards are known to include, for example, processes such as injection molding, compression molding and extrusion. In the injection molding or compression molding, severe conditioning is required for the temperature of molten resin, pressure applied thereto, precision of a molds, etc. in order to assure flatness and smoothness of substrates and to prevent occurrence of warpage and inclusion of bubbles in substrates. In addition, an apparatus with a large scale is required, resulting in a high production cost. In the injection molding, it is also difficult to produce substrates as thin as 0.4 mm or less and having a low double refraction as in substrates for optical cards. Moreover, in the compression molding and injection molding, substrates are formed sheet-by-sheet and hence their productivity is poor.

As for the extrusion, substrates for information recording mediums can be manufactured by bringing a roll stamper provided with a stamper member, into pressure contact with the surface of a molten-resin sheet extruded from an extruder and continuously transferring patterns corresponding to preformats such as tracking grooves or prepits to the surface of the resin sheet. Hence, the extrusion is advantageous for the mass-productivity of substrates, and in recent years researches thereon have been put forward as a process for manufacturing substrates for information recording mediums.

Incidentally, roll stampars used in the extrusion, for molding substrates for information recording mediums are conventionally manufactured by the following methods.

(1) A method in which preformat patterns are directly formed in the periphery of a roll substrate whose periphery has been mirror-finished (hereinafter "specular roll substrate").

(2) A method in which a flexible stamper member with preformat patterns previously formed on its surface is uniformly stuck to the periphery of a specular roll substrate by means of an adhesive.

(3) A method in which a flexible stamper member with preformat patterns previously formed on its surface is screwed to the periphery of a specular roll substrate.

Of the above conventional techniques, the method (1) makes it necessary to change the whole roll stamper for new one even when only one fault is produced in preformat patterns, resulting in a poor molding efficiency. The roll stamper produced using the method (2) tends to undergo changes with time on the adhesive because of the heat of the resin sheet formed by extrusion or the heat of the roll stamper itself, and there is the problem that its adhesive force decreases to cause separation of the stamper from the specular roll, resulting in a very short lifetime of the roll stamper. There is another problem that bubbles tend to be formed in the adhesive and any irregularities caused by such bubbles are unwantedly transferred to the substrate, making it difficult to achieve scrupulous transfer of patterns to cause faulty transfer.

The roll stamper produced using the technique described in the method (3) may cause a strain in the flexible stamper member at the portions fastened with screws, or cause an unevenness at the screwed portions, i.e., the fastened portions, bringing about the problems that this unevenness or strain causes faulty transfer of preformat patterns to the molten-resin sheet and also this unevenness gives a non-uniform pressure applied to the molten-resin sheet to cause double refraction when, for example, a polycarbonate is used as the resin.

As a means for solving such problems, the present inventors have disclosed in Japanese Patent Application Laid-Open No. 3-97909 a roll stamper comprising a flexible stamper member provided with fixing members at both ends of its back surface, and a pair of fit grooves capable of fittingly receiving said fixing members, formed in the periphery of a roll substrate; said fixing members being so fitted to said fit grooves that said flexible stamper member is fixed along the periphery of the roll substrate between said fit grooves. This roll stamper has a constitution advantageous in that the fixing members have no influence on the state of the surface of the flexible stamper member. It, however, can not well stand against the flexible stamper member undergoing thermal expansion due to the heating of the roll stamper. In particular, a gap may be made between the flexible stamper member and the roll substrate when the roll stamper is so constituted as to have a large difference in elongation due to thermal expansion, between the flexible stamper member and roll substrate. This may give no smooth conduction of the heat having transferred from the molten-resin sheet to the flexible stamper member, to bring about the problem that a locally hightemperature region is produced on the surface of the roll stamper and besides the resin sheet may stick around the periphery of the roll stamper.

SUMMARY OF THE INVENTION

The present invention was made taking account of the prior art discussed above. An object of the present invention is to provide a roll stamper having a specular roll substrate to which a flexible stamper member can be surely fixed even when the flexible stamper member has undergone thermal expansion, and the back surface of the flexible stamper member being brought into close contact with the periphery of the specular roll substrate.

Another object of the present invention is to provide an apparatus for manufacturing a substrate sheet for information recording mediums, that enables stable transfer of preformat patterns without causing any sticking of resin sheet to a roll stamper even when a molten-resin sheet is continuously molded over a long period of time.

Still another object of the present invention is to provide a process for manufacturing a substrate sheet for information recording mediums, that can achieve high-precision transfer of preformat patterns.

The roll stamper of the present invention is a roll stamper for forming a substrate sheet for information recording mediums, comprising;

a flexible stamper member having a pattern corresponding to a preformat for an information recording medium;

a first fixing member and a second fixing member respectively joined to both ends of said stamper member in an integral form; and a pair of fit grooves capable of fittingly receiving said fixing members, formed in the periphery of a specular roll substrate in parallel to the axial direction of said specular roll substrate;

said fixing members being so fitted to said fit grooves that said stamper member is fixed along the periphery of said specular roll substrate between said fit grooves; wherein;

said first fixing member comprises a first member showing a coefficient of linear expansion substantially equal to the coefficient of linear expansion of said stamper member and a second member having a larger coefficient of linear expansion than the coefficient of linear expansion of said first member, said first member being joined to said stamper member and said second member being positioned inside said first member with respect to said second fixing member; and said roll stamper is so set up as to satisfy the relationship of expression (1):

$$\Delta L_1 - \Delta L_2 < L_{3a} \tag{1}$$

wherein, as elongation in the state said roll stamper is heated to the desired temperature, $\Delta L_1$ is an elongation of the length of said stamper member, $\Delta L_2$ is the sum of an elongation of the width of the second fixing member and an elongation of the distance between the fit grooves of said roll substrate, and $\Delta L_{3a}$ is an elongation of the width of said first fixing member toward the inside with respect to the second fixing member, from the part at which said stamper member is joined to said first fixing member.

The information recording medium substrate manufacturing apparatus of the present invention is an apparatus for manufacturing a substrate sheet for information recording mediums, comprising a means for melt-extruding a resin to form a molten-resin sheet and a roll stamper having a pattern corresponding to a preformat formed in its surface, wherein;

said roll stamper comprises;

a flexible stamper member having a pattern corresponding to a preformat for an information recording medium;

a first fixing member and a second fixing member respectively joined to both ends of said stamper member in an integral form; and a pair of fit grooves capable of fittingly receiving said fixing members, formed in the periphery of a specular roll substrate in parallel to the axial direction of said specular roll substrate;

said fixing members being so fitted to said fit grooves that said stamper member is fixed along the periphery of said specular roll substrate between said fit grooves; wherein;

said first fixing member comprises a first member showing a coefficient of linear expansion substantially equal to the coefficient of linear expansion of said stamper member and a second member having a larger coefficient of linear expansion than the coefficient of linear expansion of said first member, said first member being joined to said stamper member and said second member being positioned inside said first member with respect to said second fixing member; and said roll stamper is so set up as to satisfy the relationship of expression (1):

$$\Delta L_1 - \Delta L_2 < L_{3a} \tag{1}$$

wherein, as elongation in the state said roll stamper is heated to the desired temperature, $\Delta L_1$ is an elongation of the length of said stamper member, $\Delta L_2$ is the sum of an elongation of the width of the second fixing member and an elongation of the distance between the fit grooves of said roll substrate, and $\Delta L_{3a}$ is an elongation of the width of said first fixing member toward the inside with respect to the second fixing member, from the part at which said stamper member is joined to said first fixing member.

The information recording medium substrate manufacturing process of the present invention is a process for manufacturing a substrate sheet for information recording mediums, comprising the steps of melt-extruding a resin to form a molten-resin sheet and bringing said resin sheet into contact with a roll stamper having a pattern corresponding to a preformat formed in its surface to transfer said preformat pattern to said resin sheet surface, wherein;

said roll stamper comprises;

a flexible stamper member having a pattern corresponding to a preformat for an information recording medium;

a first fixing member and a Second fixing member respectively joined to both ends of said stamper member in an integral form; and a pair of fit grooves capable of fittingly receiving said fixing members, formed in the periphery of a specular roll substrate in parallel to the axial direction of said specular roll substrate;

said fixing members being so fitted to said fit grooves that said stamper member is fixed along the periphery of said specular roll substrate between said fit grooves; wherein;

said first fixing member comprises a first member showing a coefficient of linear expansion substantially equal to the coefficient of linear expansion of said stamper member and a second member having a larger coefficient of linear expansion than the coefficient of linear expansion of said first member, said first member being joined to said stamper member and said second member being positioned inside said first member with respect to said second fixing member; and said roll stamper is so set up as to satisfy the relationship expression (1):

$$\Delta L_1 - \Delta L_2 < \Delta L_{31} \tag{1}$$

wherein, as elongation in the state said roll stamper is heated to the desired temperature, $\Delta L_1$ is an elongation of the length of said stamper member, $\Delta L_2$ is the sum of an elongation of the width of the second fixing member and an elongation of the distance between the fit grooves of said roll substrate, and $\neq L_{3a}$ is an elongation of the width of said first fixing member toward the inside with respect to the second fixing member, from the part at which said stamper member is joined to said first fixing member.

According to the present invention, the elongation due to thermal expansion of the flexible stamper member is absorbed by the elongation due to thermal expansion of the second member of the first fixing member, so that a good fixation can be kept between the flexible stamper member and the specular roll substrate even when the roll stamper is heated, and hence any temperature non-uniformity on the surface of the roll stamper can be prevented from occurring even when the molten-resin sheet is continuously molded.

According to the present invention, the flexible stamper member is joined to the first member having a coefficient of linear expansion substantially equal to the coefficient of linear expansion of the flexible stamper member, so that any strain can be prevented from being produced in the flexible stamper member even when the roll stamper is heated, and hence preformat patterns can be transferred to the resin sheet surface in a high precision.

DESCRIPTION OF THE PREFERRED EMBODIMENT

The present invention will be described below in detail with reference to the accompanying drawings.

Figure 1:
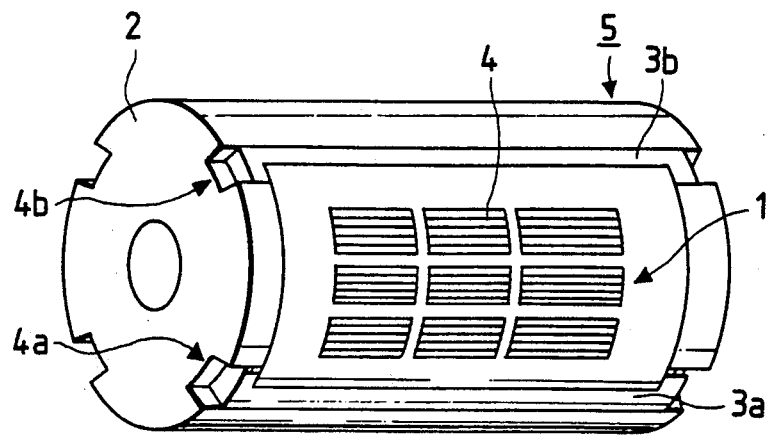
FIG. 1 is a perspective illustration of an embodiment of the roll stamper of the present invention.

FIG. 1 is a perspective illustration to schematically show an embodiment of a roll stamper 5 according to the present invention. In FIG. 1, reference numeral 1 denotes a flexible stamper member 1 having preformat patterns 4 for optical cards on its surface; 2, a specular roll substrate to which the flexible stamper member 1 is fixed; 3a and 3b, a pair of fixing members used for fixing the flexible stamper member 1 to the roll substrate 2, which are respectively joined to both ends of the flexible stamper member 1 at its back surface. Fit grooves 4a and 4b capable of respectively fittingly receiving the fixing members is formed in the periphery of the roll substrate 2 in the direction of the axis of the roll substrate 2. The fixing members 3a and 3b are engaged with the fit grooves 4a and 4b, respectively.

Figure 2:
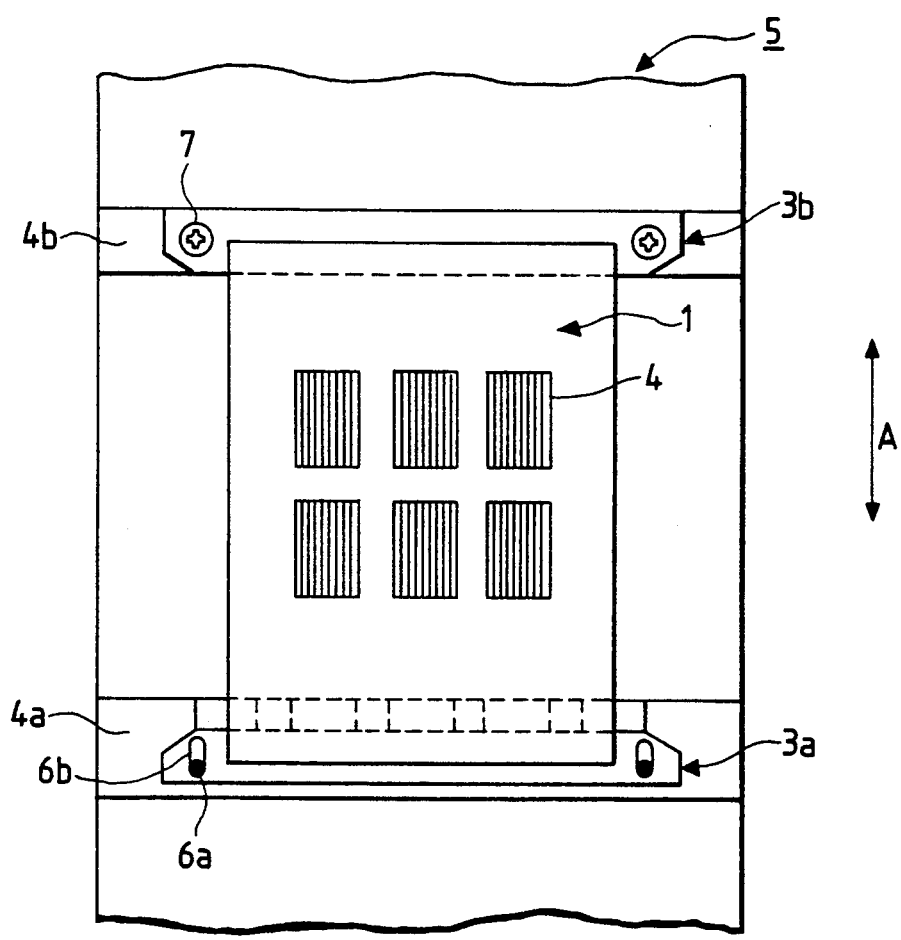
FIG. 2 is a partial enlarged plan view of the roll stamper shown in FIG. 1.
Figure 3A:
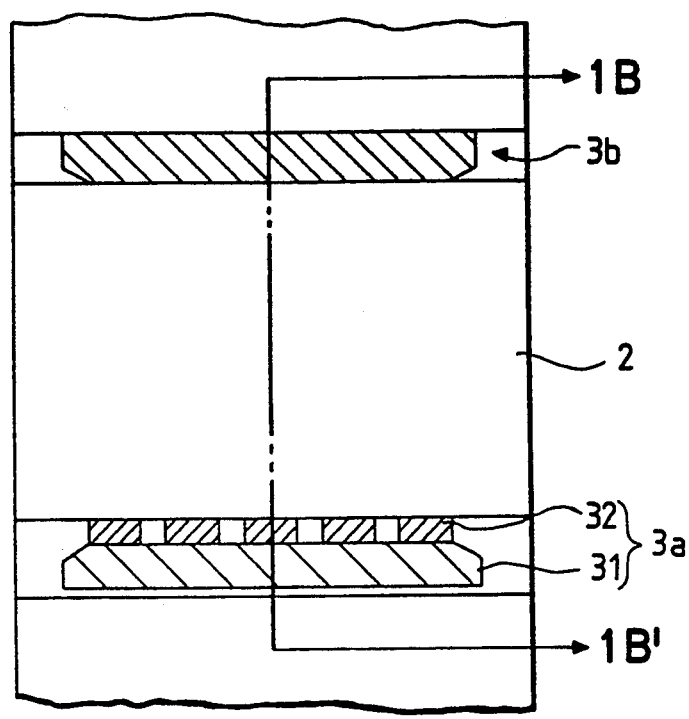
FIG. 3A is a partial enlarged plan view of the roll stamper shown in FIG. 1, in the state a stamper member 1 is omitted.
Figure 3B:
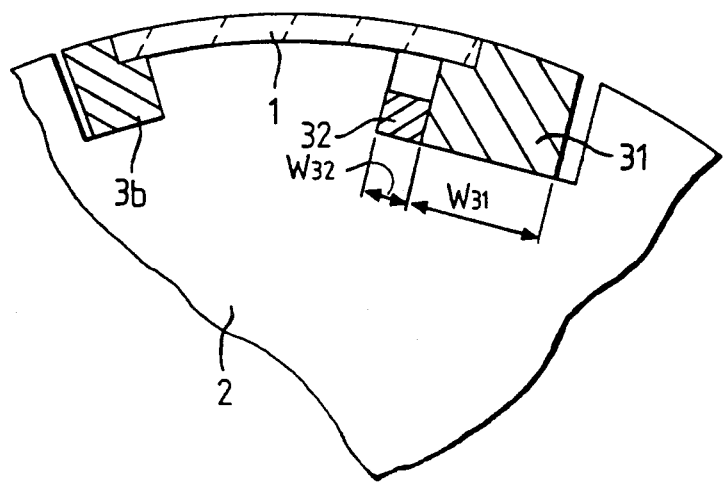
FIG. 3B is a partial cross section of the roll stamper shown in FIG. 1.

FIG. 2 is an enlarged plan view of the vicinity of the fixing members 3a and 3b of the roll stamper 5 shown in FIG. 1. FIG. 3A is an enlarged plan view of the vicinity of the fixing members 3a and 3b, where the flexible stamper member 1 is omitted for simplicity, and FIG. 3B is a cross section along the line B-B' in FIG. 3A.

The structure of the roll stamper according to the present invention will be detailed below with reference to FIGS. 2, 3A and 3B.

Figure 4:
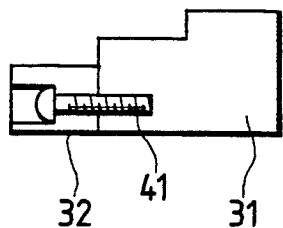
FIG. 4 is a schematic cross section of an embodiment of the first fixing member used in the roll stamper of the present invention.

The fixing member 3a is comprised of a first member 31 and a second member 32. The member 31 and the member 32 are, for example, fastened to each other with a bolt 41 as shown in FIG. 4, and the flexible stamper member 1 is joined to the member 31. In the present invention, in the fixing member 3a, a material having a coefficient of linear expansion substantially equal to the coefficient of linear expansion of the flexible stamper member 1 is used as the member 31 and a material having a larger coefficient of linear expansion than the flexible stamper member 1 and substrate sheet 2 is used as the member 32. The member 32 is so provided as to be positioned inside the member 31 with respect to the fixing member 3b.

Of the fit grooves 4a and 4b formed in the periphery of the specular roll substrate, the groove 4b is formed to have substantially the same cross-sectional shape as the cross-sectional shape of the fixing member 3b, and the fixing member 3b is fitted to the fit groove 4b, whereby one end of the flexible stamper member can be substantially fixed to the roll substrate 2. As for the fit groove 4a, it is so formed that its width $W_{4a}$ is larger than width $W_{3a}$ of the fixing member 3a so that the fixing member 3a can move in the fit groove 4a as a result of thermal expansion of the member 32 of the fixing member 3a after the fixing member 3a has been fitted to the fit groove 4a.

A hole 6b through which a screw or screws 6a used to fix the fixing member 3a to the roll substrate 2 passes is formed into an oblong hole so that the fixing member 3a can move in the lengthwise direction (the direction A shown in FIG. 2) of the stamper member 1 in the state the fixing member 3a has not been completely fixed to the roll substrate 2 as shown in FIG. 2.

The roll stamper 5 of the present invention can be assembled in the following way: The fixing members 3a and 3b joined to the back surface of the flexible stamper member 1 are fitted to the fit grooves 4a and 4b, respectively, of the specular roll substrate 2. Then the fixing member 3a is loosely provisionally fastened with the screw 6a to the roll substrate 2 so as for the fixing member 3a to be movable in the direction A, and thereafter the roll stamper is heated to a molding temperature, so that the fixing member 3a undergoes thermal expansion and, while absorbing the elongation due to the thermal expansion of the flexible stamper member, imparts a tension to the flexible stamper member, and hence the flexible stamper member 1 can be brought into close contact with the periphery of the roll substrate 2. Thereafter the fixing member 3a joined to the flexible stamper member 1 is firmly fastened to the roll substrate 2 with the screw 6a. Thus the roll stamper 5 of the present invention can be obtained.

Figure 11:
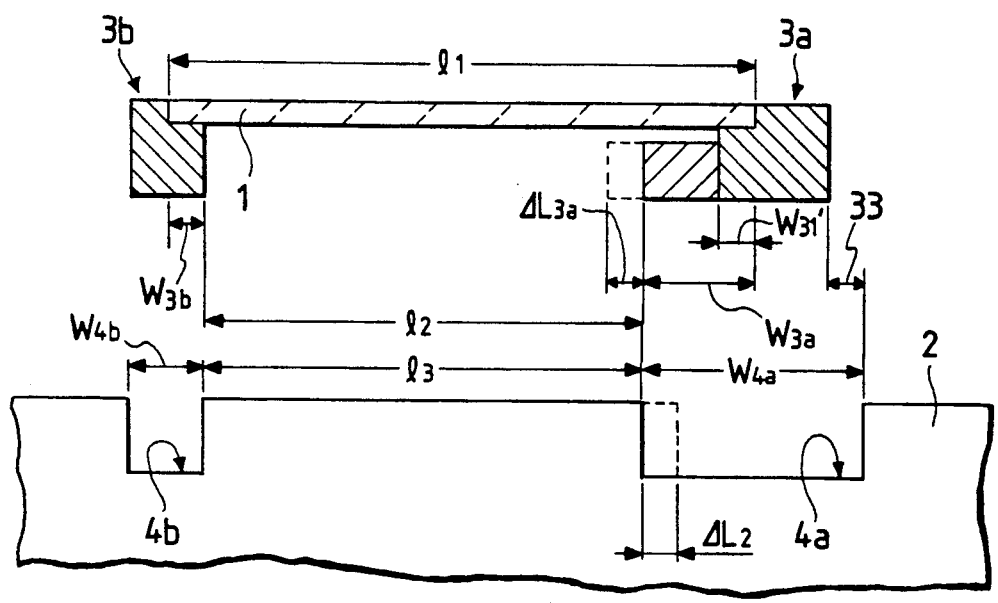
FIG. 11 is a developed view of a partial cross section of the roll stamper shown in FIG. 3B.

In the roll stamper 5 of the present invention, the fixing member 3a is constructed in the following way: As shown in FIG. 11, which is a developed view of FIG. 3B, the sum of an elongation of the width $W_{3b}$ of the fixing member 3b and an elongation of the distance 23 between the fit grooves of the roll substrate 2 is represented by $\Delta L_2$, an elongation of the width $W_{3a}$ of the fixing member 3a toward the inside with respect to the fixing member 3b, from the part at which the flexible stamper member 1 is joined to the fixing member 3a is represented by $\Delta L_{3a}$, and an elongation of the length $l_1$ of the stamper member is represented by $\Delta L_1$ (not shown), all as elongation in the state the roll stamper is heated to the desired temperature. Under these parameters, materials and widths of the members 31 and 32 are so selected as to satisfy the relationship of expression (1):

$$66 L_1 - \Delta L_2 < \Delta L_{3a} \tag{1}$$

to set up the roll stamper. Thus the flexible stamper member 1 can be brought into more highly close contact with the periphery of the roll substrate 2.

In a preferred embodiment, the relationship between $\Delta L_1$, $\Delta L_2$ and $\Delta L_{3a}$ may be so set up as to be represented by expression (2) below, so that it becomes possible to surely bring the flexible stamper member 1 into close contact with the roll substrate 2 without causing no strain in the former.

$$1 < \Delta L_{3a}/(\Delta L_1 - \Delta L_2) < 1.4 \tag{2}$$

In the present invention, the width of the second fixing member 3b refers to the width of the region in which the fixing member 3b overlaps with the flexible stamper member 1, i.e., $W_{3b}$ in FIG. 11. The width of the fixing member 3b itself is distinguished from it as a shape width of the fixing member 3b.

The material used for the member 31 of the fixing member 3a in the present invention is comprised of the material having a coefficient of linear expansion substantially equal to that of the flexible stamper member 1 as previously stated. Such a material is preferable since no separation occurs between the flexible stamper member 1 and the member 31 joined thereto, when the roll stamper is heated, and also no strain is produced in the flexible stamper member 1.

In the present invention, what is meant by "coefficient of linear expansion substantially equal to" is that the member 31 has a coefficient of linear expansion within 0.8 time to 1.2 times the coefficient of linear expansion of the stamper member.

In order to prevent the fixing member 3a from undergoing deformation such as bend because of the member 32 having a larger coefficient of linear expansion, the member 31 may preferably be made of a material having a Young's modulus of from $4 \times 10^3$ to $22 \times 10^3$ kg/mm², and particularly from $5 \times 10^3$ to $22 \times 10^3$ kg/mm², and a Brinell hardness of from 5 to 500, and particularly from 20 to 200. The material may specifically include, for example, stainless steel, copper alloy, carbon steel, cast iron, aluminum alloy and ceramic. The material having the relationship with the coefficient of linear expansion of the flexible stamper member 1 within the above range may be selected from these materials and used. When, for example, nickel (coefficient of linear expansion: $14 \times 10^{-6}$/°C.) is used as the flexible stamper member it is possible to use, for example, 18-8 stainless steel (coefficient of linear expansion: $16.7 \times 10^{-6}$/°C.; Young's modulus: $20.4 \times 10^3$ kg/mm²; Brinell hardness: 185).

The member 31 and the fixing member 3b may each preferably have a cross-sectional area of from 30 mm² to 800 mm² so that the fixing member 3a can be prohibited from bending and also no decrease in the strength of the roll substrate 2 can be brought about because of excessively large fit grooves of the roll substrate to which these fixing members are fitted.

Incidentally, in the present invention, the depth of the fit grooves 4a and 4b each, formed in the roll substrate 2, may vary depending on the wall thickness of the roll substrate 2. For example, in the case of a hollow roll substrate with a wall thickness of from 10 to 50 mm, the depth may preferably be in the range of from 3 mm to 20 mm, and particularly from 5 mm to 20 mm. The fit grooves 4a and 4b having the depth within the above range cause no decrease in the strength of the roll substrate, enable sure engagement with the fixing members 3a and 3b, and also can make relatively small the change in heat capacity of the roll stamper 5, caused when the fixing members are fitted.

As for the width $W_{4a}$ of the fit groove 4a (see FIG. 11), the fit groove 4a has at least the width corresponding to $W_{31} + W_{32}$ of the fixing member 3a (see FIG. 3B) and in addition thereto must have a clearance 33 provided downward the direction A in FIG. 2 so that an expansion of the fixing member 3a can be accepted and a tension can be applied to the flexible stamper member 1. The clearance 33 is so provided as to be 0.5 to 2 mm in the state the roll stamper 5 is heated and the fixing member 3a has undergone thermal expansion, whereby a tension can be surely applied to the flexible stamper member 1 and also a difference in height can be prevented from occurring on the periphery of the roll stamper 5.

In the present invention, as shown in FIG. 11, distance $l_2$ between the fixing members 3a and 3b joined to the flexible stamper member 1 and distance $l_3$ between the fit grooves 4a and 4b should be substantially the same, i.e., the same within the range in which the fixing members 3a and 3b are respectively engageable with the fit grooves 4a and 4b. In such an instance, the elongation of the flexible stamper member 1 during the heating of the roll stamper can be absorbed and also the member 32 of the fixing member 3a, necessary for applying the tension to the flexible stamper member 1, can be made more small-sized, so that it is possible to prohibit any bend of the fixing member 3a which tends to be caused therein by a difference in coefficient of linear expansion between the member 31 and member 32.

In the present invention, the distance $l_3$ between the fit grooves 4a and 4b and the length $l_1$ of the flexible stamper member 1 may preferably be in the relation that $l_3/l_1$ is not less than 0.75. More specifically, $l_3/l_1$ indicates a proportion in which the flexible stamper member 1 comes into direct contact with the roll substrate 2. Then the region in which the flexible stamper member 1 comes into direct contact with the roll substrate 2 is a region most suited for molding the molten-resin sheet. In the present invention, the preformat patterns on the surface of the flexible stamper member 1 may preferably be formed in this region. At this time, $l_3/l_1$ should be made not less than 0.75, whereby a broader region suited for the formation of preformat patterns can be ensured on the surface of the flexible stamper member and a substrate sheet for information recording mediums with a high quality can be manufactured in a good productivity;

In this case, a sufficient length at which the flexible stamper member 1 overlaps with each fixing member can not be ensured. However, the constitution taken in the present invention makes it possible to surely apply the tension to the flexible stamper member even after the heating of the roll stamper. The constitution of the present invention is particularly effective when the value of $(\Delta L_1 - \Delta L_2)$ is larger than an elongation $\Delta L'_{31}$ due to thermal expansion, of the width at which the member 31 of the fixing member 3a overlaps with the flexible stamper member 1 ($W'_{31}$; see FIG. 11), i.e., a value of $\{(W'_{31} \times \alpha \times \Delta T) - W_{31}\}$ wherein $\alpha$ is a coefficient of linear expansion of the member 31 and $\Delta T$ is a value of (roll stamper heating temperature $-25°$ C.).

The member 32 of the fixing member 3a in the present invention will be described below.

The member 32 is, as previously mentioned, so provided as to be positioned inside the member 31 with respect to the fixing member 3b, suitably selecting its material and width $W_{32}$ (see FIG. 3B) so that the elongation $\Delta L_{3a}$ due to thermal expansion of the fixing member 3a becomes larger than the difference between $\Delta L_1$ and $\Delta L_2$.

The member 32 may preferably be comprised of a material having a coefficient of linear expansion 1.3 times or more and 2.1 times or less, particularly 1.4 times or more and 1.8 times or less, the maximum value among the values of coefficients of linear expansion shown by the respective materials constituting the roll substrate 2, flexible stamper member 1 and member 31. Use of such a material can make small in size the member 32 necessary to apply the tension to the flexible stamper member 1 and can prevent deformation of the fixing member 3a. Use of a material having a Young's modulus of from $4 \times 10^3$ to $22 \times 10^3$ kg/mm$^2$, and particularly from $5 \times 10^3$ to $22 \times 10^3$ kg/mm$^2$, and a Brinell hardness of from 5 to 500, and particularly from 20 to 200, is also preferable since the tension can be uniformly and surely applied to the flexible stamper member 1.

The material used as the member 32 in the present invention may actually vary depending on the materials for the flexible stamper member 1, roll substrate 2 and fixing member 3a. When, for example, nickel (coefficient of linear expansion: $14 \times 10^{-6}/°$C.) is used as the flexible stamper member, iron (coefficient of linear expansion: $13 \times 10^{-6}/°$C.) or chromium (coefficient of linear expansion: $10.19 \times 10^{-6}/°$C.) is used as the roll substrate and 18-8 stainless steel (coefficient of linear expansion: $16.7 \times 10^{-6}/°$C.) is used as the member 31, it is preferable to use a metal such as aluminum (coefficient of linear expansion: $24 \times 10^{-6}/°$C.; Young's modulus: $7.05 \times 10^3$ kg/mm$^2$; Brinell hardness: 25), magnesium (coefficient of linear expansion: $26 \times 10^{-6}/°$C.; Young's modulus: $4.2 \times 10$ kg/mm$^2$; Brinell hardness: 25) or tin (coefficient of linear expansion: $24 \times 10^{-6}/°$C.; Young's modulus: $4.15 \times 10^3$ kg/mm$^2$; Brinell hardness: 5.3), or an alloy such as duralmin (coefficient of linear expansion: $23 \times 10^{-6}/°$C.; Young's modulus: $7 \times 10^3$ kg/mm$^2$; Brinell hardness: 45) or Magnalium (composition: Fe 0.3, Mg 10, Si 10, and the balance of Al; coefficient of linear expansion: $25 \times 10^{-6}/°$C.; Young's modulus: $7.25 \times 10^3$ kg/mm$^2$; Brinell hardness: 75). Taking account of mechanical strength, workability and thermal resistance, it is particularly preferable to use aluminum or duralmin.

Figure 5:
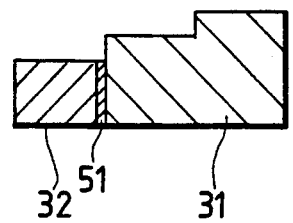
FIG. 5 is a schematic cross section of another embodiment of the first fixing member used in the roll stamper of the present invention.

The members 31 and 32 of the fixing member 3a in the present invention may be fastened with screws as previously mentioned (see FIG. 4), or as shown in FIG. 5 the members 31 and 32 may be bonded to each other via an adhesive layer 51. In the latter case, it is preferable to use a heat-resistant adhesive so that no separation of the members 31 and 32 is caused by a difference in coefficient of linear expansion between them. For example, it is possible to use an adhesive of an epoxy resin or silicone resin type.

Figure 6:
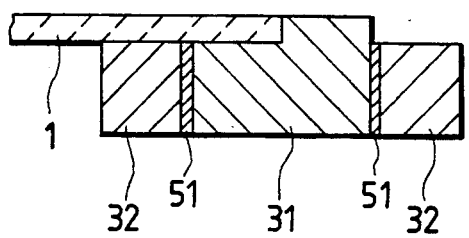
FIG. 6 is a schematic cross section of still another embodiment of the first fixing member used in the roll stamper of the present invention.

When the members 31 and 32 are fastened or bonded, the member 32 need not be in contact with the whole surface of one side of the member 31, and the member 32 may be partly provided to the side of the member 31 as shown in FIG. 2 or 3B, or the member 31 may be sandwiched between members 32 as shown in FIG. 6. Such constitution is effective for preventing deformation of the fixing member 3a.

Figure 7:
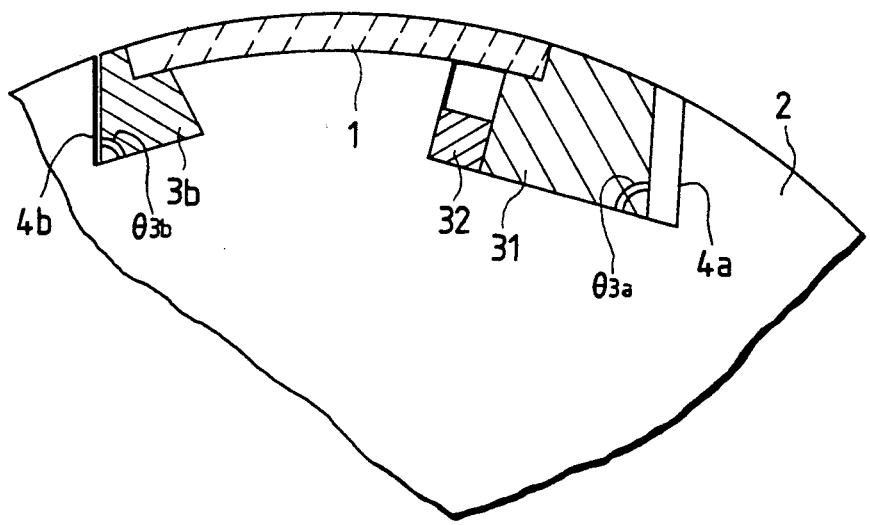
FIG. 7 is a schematic partial cross section of another embodiment of the roll stamper of the present invention.

Referring to the cross-sectional shape of the fit groove 4b formed in the roll substrate 2 and that of the fixing member 3b to be fitted to the fit groove 4b, they may each have a shape such that they engage with each other as shown in FIG. 7 so as for the flexible stamper member to be prevented from separating from the roll substrate, as exemplified by a trapezoid, whose top side is shorter than its bottom side. In such a case, the fixing member 3b need not be fastened with a screw 7 to the roll substrate as shown in FIG. 2, and the fixing member 3b and fit groove 4b become disengageable as a result of application of the tension to the flexible stamper member. Thus, this is a preferred embodiment.

Referring also to the cross-sectional shapes of the fit groove 4a and fixing member 3a, the right end and right sidewall (in the drawing) of the fixing member 3a and fit groove 4a may be tapered in the depth direction and height direction, respectively, as shown in FIG. 7. Such a constitution is effective for preventing the fixing member 3a from loosening or coming off from the fit groove 4a when the tension is applied to the flexible stamper member 1.

Incidentally, in the present invention, the second fixing member 3b may be made of the same material used for the member 31 of the first fixing member 3a.

As materials for the flexible stamper member 1 used in the present invention, materials commonly available as materials for stamper members can be used. For example, nickel is a preferable material because of its readiness for working into stamper members and its durability required for stamper members.

The flexible stamper member 1 can be produced by a conventional method, for example, by electroforming. As to the thickness of the flexible stamper member, an excessively thick member requires a large roll diameter and hence requires a large extruder. On the other hand, an excessively thin member may result in a loss of stiffness to tend to break. Hence, it is suitable for the stamper member to have a thickness of from 50 μm to 500 μm.

The information recording medium preformat pattern 4 formed in the flexible stamper member 1 of the present invention may specifically include, for example, a pattern corresponding to optical disk or optical card tracking groove or grooves in the form of a spiral, concentric circles or stripes with a groove width of 0.5 to 2 μm, a groove pitch of 1 to 5 μm and a groove depth of 200 to 5,000 Å, a pattern corresponding to optical disk or optical card tracking groove or grooves in the form of a spiral, concentric circles or stripes with a groove width of 2 to 5 μm, a groove pitch of 8 to 15 μm and a groove depth of 200 to 5,000 Å, and a pattern corresponding to prepits provided in or between these grooves.

The back of the stamper member 1, in particular, the back defined by the region on the reverse surface of which the preformat pattern or patterns 4 is/are provided, may preferably have been mirror-polished to have a surface roughness of 0.1 μm or less.

The roll substrate 2 used in the present invention may preferably be polished on its periphery to have a surface roughness of 0.1 μm or less, and may preferably be a hollow roll substrate through the inside of which a heating medium, e.g., an oil, for heating the roll stamper 5 can be circulated. Materials used for the roll substrate 2 may include iron, carbon steel, chromium steel, superhard alloys, die casting steel as exemplified by maraging steel, which are materials capable of being mirror-finished. With regard to the material used for the roll substrate 2 and the size of the roll substrate 2, they may preferably be so designed that at the time of the heating of the roll stamper 5 the sum or total elongation $\Delta L_2$ of an elongation of the width $W_{3b}$ of the fixing member $3b$ and an elongation of the distance $l_3$ between the fit grooves of the roll substrate 2 is smaller than an elongation $\Delta L_1$ of the length $l_1$ of the flexible stamper member 1 so that the fixing member $3a$ can surely impart the tension to the flexible stamper member 1.

As the material used for the roll substrate 2, it is preferable to use a material having a coefficient of linear expansion of $13 \times 10^{-6}/°C$. or less in order to prevent from varying a size of the roll substrate at the time of heating.

The formation of the fit grooves $4a$ and $4b$ in the roll substrate 2 can be carried out by a method such as electric discharge machining, bite cutting, or dressing.

Figure 8:
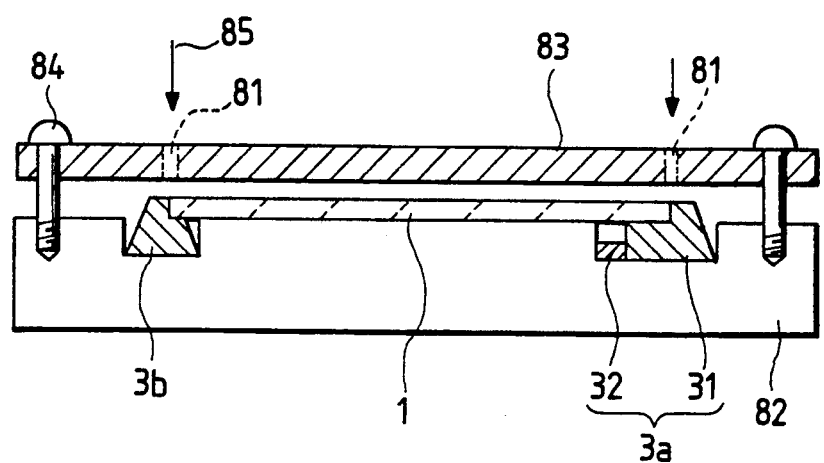
FIG. 8 illustrates a manner by which the flexible stamper member is joined to the fixing members.

The fixing members $3a$ and $3b$ that must be integrally provided to the flexible stamper member 1 can be joined to the stamper member by any methods so long as the stamper member 1 and the fixing members $3a$ and $3b$ do not separate from each other in the course of the attaching of the stamper member 1 to the roll substrate 2, during the molding of the molten-resin sheet and after the molding. Taking account of the bond strength of the stamper member to the fixing members and the surface uniformity of the stamper member surface, it is preferable to use, for example, electron beam welding, silver solder welding or laser welding. Taking an example of the electron beam welding or laser welding, the members can be joined in the following way: For example, as shown in FIG. 8, the fixing members $3a$ and $3b$ are set on given positions of a welding jig 82 having beam slits 81. Next, the welding surface of a continuous-sheet flexible stamper member 1 (the surface on the side on which the preformat patterns such as tracking grooves and information pits are not provided) and the welding surfaces of the fixing members $3a$ and $3b$ are put face-to-face, and a cover 83 is fitted from above which is then fastened with screws 84 to complete setting. Subsequently, electron beams or laser beams, e.g., YAG laser beams, are applied to the stamper member 1 through the slits 81. Thus the fixing members can be joined to the stamper member 1.

In the case of the welding carried out using electron beams or laser beams, the welding may be carried out by pulsewise applying the beams, for example, at a frequency of 60 Hz and a duty cycle of 20 to 50% in approximation, so that a strain can be greatly prohibited from being produced in the flexible stamper member.

In the case when the welding is carried out by silver solder welding, the welding surface of the flexible stamper member 1 and the welding surfaces of the fixing members $3a$ and $3b$ are put face-to-face interposing a silver solder between the welding surfaces, and a pressure of 20 to 50 kg/cm² is applied to the welding surfaces to bond the stamper member 1 to the fixing members $3a$ and $3b$, followed by silver solder welding in a vacuum heating oven under conditions of, for example, a degree of vacuum of $2 \times 10^{-5}$ Torr, a peak heating temperature of 820° C. and a heating time of 7 hours. Thus the fixing members can be joined to the continuous-sheet flexible stamper member.

The welding of the fixing members $3a$ and $3b$ to the stamper member 1 may be carried out after the fixing members $3a$ and $3b$ have been fitted in the grooves of the roll substrate 2, whereby welding registration can be made in a good precision.

Figure 9:
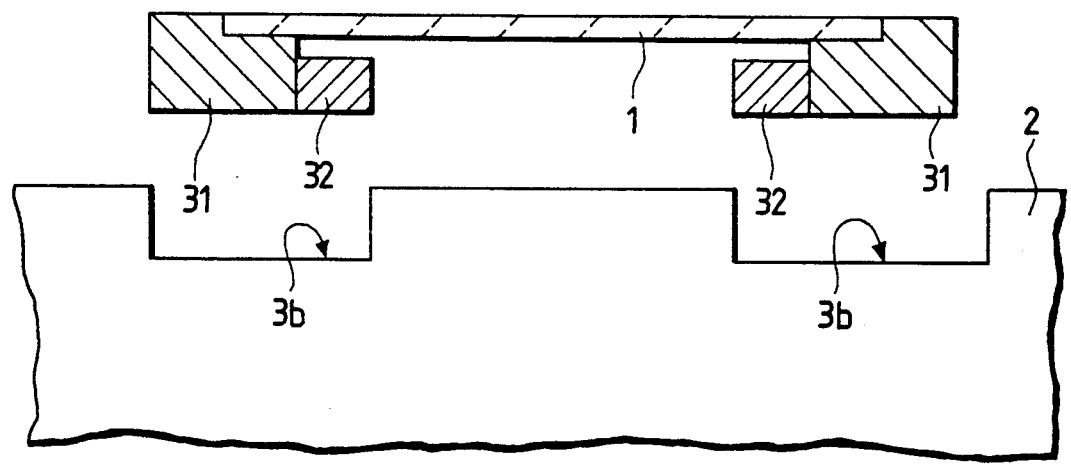
FIG. 9 illustrates still another embodiment of the roll stamper of the present invention.

In the present invention, as shown in FIG. 9, the second fixing member $3b$ joined to one end of the flexible stamper member 1 may be replaced with a fixing member having the same construction as the fixing member $3a$ so that the tension can be applied to the flexible stamper member 1 from both ends.

Figure 13:
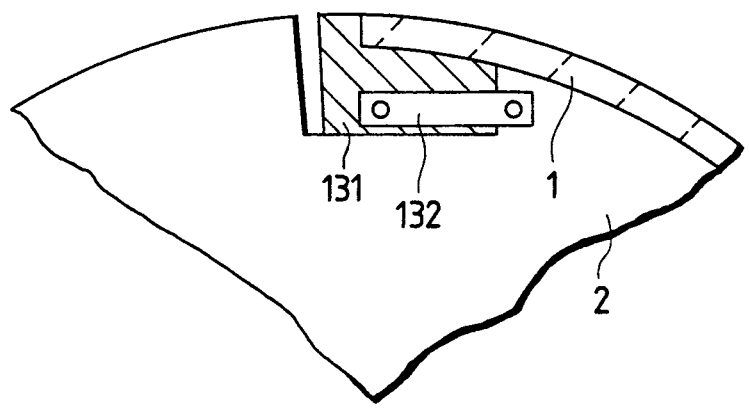
FIG. 13 is a schematic partial cross section of a further embodiment of the roll stamper of the present invention.

As another embodiment of the roll stamper of the present invention, as shown in FIG. 13, a member 32 having a larger coefficient of linear expansion may be attached to each side face of the roll substrate 2 and each side face of a fixing member 131 so that the fixing member 131 can be pulled in the direction in which the tension is applied to the flexible stamper member 1, as a result of thermal expansion of the member 132.

A process for continuously manufacturing the substrate sheet for information recording mediums by the use of the roll stamper shown in FIG. 1 will be described below with reference to FIG. 10.

First, resin pellets fed in an extruder 101 are heated and melted in a barrel of the extruder 101. The molten resin is pressed forward through a screw and formed into a sheet by means of a T-die 102. At this stage the resin temperature may be from 260° C. to 330° C., and preferably from 280° C. to 320° C., in the case of, for example, polycarbonate resin. From the T-die, the resin is continuously extruded into a transparent resin sheet 103 in a substantially molten state. The T-die is so provided that this molten-resin sheet is extruded between a specular roll 104 and the roll stamper 5. Subsequently, the molten-resin sheet 103 is pressed between the specular roll 104 and roll stamper 5 and between the roll stamper 5 and another specular roll 105 so that the preformat pattern 4 on the surface of the flexible stamper member 1 is transferred to the surface of the molten-resin sheet. Thus a substrate sheet 106 for information recording mediums is formed.

At this stage, the roll stamper 5 of the present invention is kept at a temperature that does not cause solidification of the molten-resin sheet on the roll stamper.

More specifically, the roll stamper may preferably be heated to a temperature within the range of +20° to −20° C. of the thermal deformation temperature of the resin used. When, for example, polycarbonate resin is used, the roll stamper may preferably be heated to have a surface temperature of from 100° to 160° C. That is, the heating in this temperature range does not allow the molten-resin sheet to rapidly cool and hence no strain such as shrinkage tends to be produced in the resin sheet. The specular rolls 104 and 105 provided opposingly to the roll stamper may preferably be set to temperatures equal to or slightly lower than the roll stamper 5.

The temperatures of these rolls can be controlled, for example, by electrically heating the rolls with heaters casted in them or by circulating a heating medium through the centers of the rolls.

As described above, according to the present invention, it is possible to obtain a roll stamper having superior durability, causing no separation of the flexible stamper member from the roll substrate even when preformat patterns are continuously transferred to the resin sheet. According to the present invention, it is also possible to fix the flexible stamper member to the periphery of the roll substrate in a well close contact to prevent formation of any gap between the flexible stamper member and the roll substrate. As a result, the heat conducted to the flexible stamper member when the resin sheet is formed can be immediately transmitted to the roll substrate and the surface temperature can be made uniform over the whole preformat-formed region of the flexible stamper member on the roll substrate. Hence, high-quality substrates for information recording mediums, having been improved in preformat transfer performance, free from faulty transfer and causing no double refraction can be obtained in a good productivity.

In addition, according to the present invention, the flexible stamper member is joined to the members relatively small in dimensional variation due to thermal expansion, and hence it is possible to obtain a roll stamper causing no strain in the flexible stamper member upon heating and having a superior preformat transfer performance.

It is also possible according to the present invention to surely apply the tension to the flexible stamper member to bring the flexible stamper member into close contact with the roll substrate, even if the roll stamper is so set up as to have a large difference in elongation due to thermal expansion between the flexible stamper member and roll substrate.

EXAMPLES

The present invention will be described below in greater detail by giving Examples. In the following Examples, the size of each member is expressed as a value obtained at room temperature (25° C.), unless particularly noted.

EXAMPLE 1

A flexible stamper member was prepared in the following way: First, the surface of a blue plate glass of 340 mm long, 340 mm broad and 10 mm thick was mirror-polished, and thereafter a photoresist (trade name: AZ-1370; available from Hoechst Japan Ltd.) was spin-coated thereon to form a photoresist layer with a thickness of 3,000 Å, followed by prebaking at 90° C. for 30 minutes. Next, using a laser exposure apparatus, optical card preformat patterns were exposed to light and developed using a developing solution (trade name: AZ-312 MIF; available from Hoechst Japan Ltd.) to form resist patterns. An original glass plate for optical cards was thus prepared.

The above preformat patterns were each a pattern formed in a region of 80 mm long and 30 mm broad, corresponding to optical card tracking grooves having a width of 3 μm, a pitch of 12 μm and a depth of 2,500 to 3,000 Å. Preformat patterns corresponding to 6 sheets of optical cards were formed on the glass original plate.

Next, on the preformat patterns, a nickel film was formed by sputtering in a thickness of 1,000 Å. On the nickel film thus formed, a nickel film was further formed by electroforming in a thickness of 220 μm, followed by mirror polishing to finish the nickel film surface in a surface roughness of 0.1 μm. Subsequently the resulting nickel film was peeled from the glass original plate and then the photoresist adhered to the preformat pattern transfer surface of the nickel film was removed, followed by trimming. The flexible stamper member 1 was thus prepared, having an external size of 300 mm long, 180 mm broad and 200 μm thick and having preformat patterns for 4 sheets of optical cards.

To the flexible stamper member 1 thus obtained, the fixing members 3a and 3b were jointed at its both ends in its longitudinal direction.

The fixing member having the construction as shown in FIG. 3 was used as the fixing member 3a. More specifically, 18-8 stainless steel with a coefficient of linear expansion of $16.7 \times 10^{-6}/°C.$, a Young's modulus of $20.4 \times 10^3$ kG/mm$^2$ and a Brinell hardness of 149 was used as the member 31. The member 31 was made to have a width $W_{31}$ of 75 mm, a height h of 10 mm and e length of 200 mm. As the member 32, a member having a width $W_{32}$ of 10 mm, a height h' of 9.8 mm and a length of 30 mm and made of aluminum having a coefficient of linear expansion of $24 \times 10^{-6}/K$ was used. Five pieces of this member 32 were prepared, and were each bolted to the side of the member 31 as shown in FIG. 3A, at intervals of 12.5 mm.

The fixing member 3b was made to have a shape width of 10 mm, a height of 10 mm and e length of 200 mm and was made of stainless steel. The amount of overlap $W_{3b}$ thereof with the flexible stamper member was set to be 5 mm.

The joining of the fixing members 3e and 3b the flexible stamper member 1 at its both ends in its longitudinal direction was carried out by electron beam welding. Stated specifically, using the welding jig as shown in FIG. 8 and using an electron beam welding apparatus (trade name: EBW6LB; manufactured by Mitsubishi Electric Corp.), the end faces of the flexible stamper member 1 were welded to join the stamper member 1 to the fixing members 3e and 3b. The welding was carried out under conditions of a degree of vacuum of $5 \times 10^{-2}$ Torr, an accelerating voltage of 60 kV, a beam current of 3.2 mA and a beam velocity of 4.0 m/min.

Figure 12:
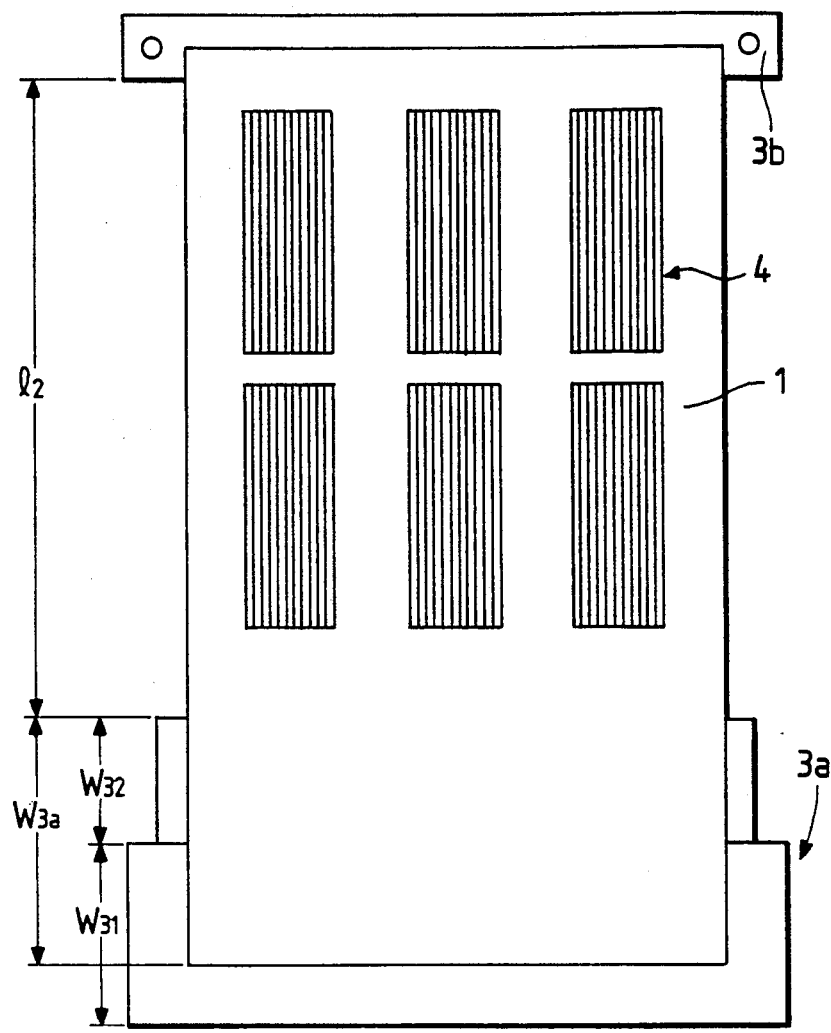
FIG. 12 is a plan view of a flexible stamper member described in Example 1.

The flexible stamper member 1 was so joined to the member 31 that the width $W_{3a}$ of the fixing member 3a toward the inside with respect to the fixing member 3b, from the part at which the flexible stamper member 1 was joined to the fixing member 3a was 70 mm. A plan view of the flexible stamper member to which the fixing members 3a and 3b have been joined are shown as FIG. 12.

As for the roll substrate 2, it was prepared in the following way:

On the periphery of a hollow roll made of iron, having a coefficient of linear expansion of $13 \times 10^{-6}/K$, a wall thickness of 25 mm, a diameter of 310 mm and a width of 500 mm, a chromium coating was formed by plating in a thickness of 0.2 mm, and its surface was finished to have a surface roughness of 0.1 μm or less to form a roll substrate 2.

Next, in the periphery of the resulting roll substrate, a groove with a depth of 10 mm, a width $W_{4a}$ of 97 mm and a length of 500 mm was formed as the fit groove 4a, and a groove with a depth of 10 mm, a width of 10.1 mm and a length of 500 mm was formed as the fit groove 4b. The distance $l_2$ between the fit grooves 4a and 4b was set to be 224.9 mm.

Subsequently, the fixing members 3a and 3b were fitted to the fit grooves 4a and 4b, respectively, and the fixing member 3a was loosely fastened with screws 6a to the roll substrate, to the extent that the stamper member 1 was movable.

Figure 10:
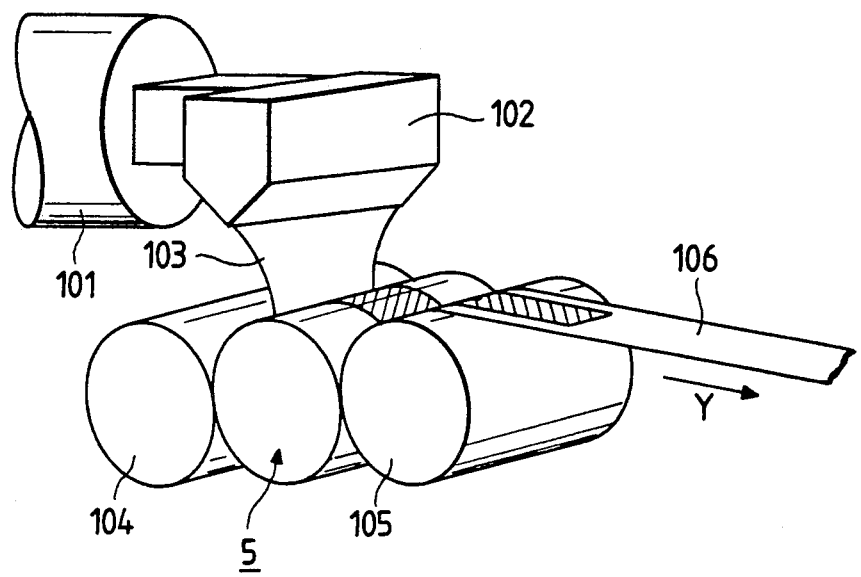
FIG. 10 is a schematic illustration of the apparatus for manufacturing the substrate sheet for information recording mediums according to the present invention.

Next, this roll stamper was set on the apparatus as shown in FIG. 10, and was heated by circulating oil through the hollow portion of the roll stamper, so as for its peripheral temperature to come to be 145° C. In this instance, the value of $(\Delta L_1 - \Delta L_2)$ was 0.143 mm and the elongation $\Delta L_{3a}$ of the width $W_{3a}$ of the fixing member 3a came to be 0.149 mm, so that a tension was applied to the flexible stamper member and hence the flexible stamper member was brought into close contact with the periphery of the roll substrate 2. Thereafter, the screws were tightened to firmly fix the fixing member 3a to the roll substrate 2.

Subsequently, polycarbonate resin was extruded from the extruder 101, and then pressed between the roll stamper 5 and the specular rolls 104 and 105. Thus a substrate sheet for optical cards was produced in a thickness of 0.4 mm. Here, the molding was continuously carried out for 10 hours under conditions of a T-die temperature of 300° C., a surface temperature of the roll stamper 5, of 145° C. and a molten-resin sheet transport speed of 3 m/min. The optical card substrate sheet thus formed showed a double refraction of as small as about 10 to 15 mm, and the preformat patterns had been transferred in a good performance. Immediately after the molding, the surface temperature in the effective region of the flexible stamper member 1 on the roll stamper 5 was measured using an infrared radiation thermometer (trade name: Thermal Video System TVS-5000; manufactured by Japan Avionics Ltd.) to examine temperature unevenness. As a result, the temperature difference was as very small as 10° C. at maximum and the region in which temperature unevenness had occurred, held in the surface area of an effective region of the flexible stamper member, was in a proportion of about 5%, proving that the flexible stamper member 1 had been in close contact with the roll substrate 2 in a good state during the molding.

Here, the effective region of the flexible stamper member is meant to be the region in which the flexible stamper member 1 overlaps with a tableland area defined between the fit grooves 4a and 4b on the roll substrate. In the present invention, the preformat patterns on the surface of the flexible stamper member are so formed that all of them are positioned within the effective region (see FIG. 12).

EXAMPLES 2-4, COMPARATIVE EXAMPLE 1

Roll stampers were prepared in the same manner as in Example 1 except that the width $W_{32}$ of the member 32, i.e., $\Delta L_{3a}/(\Delta L_1 - \Delta L_2)$, was changed as shown in Table 1 while keeping at the same value the width $W_{3a}$ of the fixing member 3a toward the inside with respect to the fixing member 3b, from the part at which the flexible stamper member 1 was joined to the fixing member 3a. Using these roll stampers, substrate sheets for optical cards were formed in the same way. Immediately after the continuous molding for 10 hours, evaluation was made on the surface temperature unevenness in the effective region of the flexible stamper member 1 on the roll substrate, end the proportion of the region in which temperature unevenness had occurred, held in the effective region of the flexible stamper member.

Results obtained are shown in Table 2.

TABLE 1

|  | $\Delta L_{3a}/(\Delta L_1-\Delta L_2)$ | $W_{32}$ |
| --- | --- | --- |
| Example 2 | 1.10 | 20 mm |
| Example 3 | 1.23 | 40 mm |
| Example 4 | 1.35 | 60 mm |
| Comparative Example 1 | 1.41 | 70 mm |

TABLE 2

|  | Temperature unevenness | Area percentage |
| --- | --- | --- |
| Example 2 | AA | AA |
| Example 3 | AA | AA |
| Example 4 | AA | AA |
| Comparative Example 1 | A | B |

Evaluation was made according to the following criteria.
Temperature unevenness
AA: 10° C. or less
A: 10° C. < Temp. ≦ 30° C.
Area percentage
AA: 5% or less
A: 5% to 15%
B: More than 15% to 20%
C: More than 20%

COMPARATIVE EXAMPLE 2

A roll stamper was prepared in the same manner as in Example 1 except that the member 32 of the fixing member 3a was omitted and the width of the member 31 toward the inside from the part at which the flexible stamper member 1 was joined thereto was set to be 70 mm.

Next, this roll stamper was set on the apparatus shown in FIG. 10, and then heated so as for the peripheral temperature of the roll stamper to come to be 145° C. In this instance, $(\Delta L_1 - \Delta L_2)$ was 0,143 mm and $\Delta L_{3a}$ came to be 0,140 mm, where no tension was applied to the flexible stamper member. Subsequently the screws 6a were tightened to firmly fix the fixing member 3a to the roll substrate 2, and thereafter the molding was continuously carried out for 10 hours to form a substrate sheet for optical cards. Evaluation was made on the surface temperature unevenness in the effective region of the flexible stamper member 1 on 25 the roll stamper 5 and the area percentage thereof.

Results obtained are shown in Table 3.

TABLE 3

|  | Temperature unevenness | Area percentage |
| --- | --- | --- |
| Comparative Example 2 | A | C |

EXAMPLE 5

A roll stamper was prepared in the same manner as in Example 1 except that the member 32 of the fixing member 3a was made to have a width $W_{32}$ of 40 mm, a height h' of 9.8 mm and a length 200 mm and was made of aluminum having a coefficient of linear expansion of $24 \times 10^{-6}$/K. Two pieces of this member 32 were prepared and stuck to both sides of the member 31 as shown in FIG. 6, using a silicone resin adhesive (trade name: TSE-3826; available from Toshiba Silicone Co., Ltd.), and the width $W_{4a}$ of the fit groove $4a$ of the roll substrate 2 was adapted to the total width $(2 \times W_{32} + W_{31})$ of the member 31 of the fixing member $3a$ and was set to be 117 mm. The molding was carried out to form a substrate sheet for optical cards.

Immediately after continuous molding for 10 hours, the surface temperature unevenness in the effective region of the flexible stamper member 1 on the roll stamper and the area percentage thereof were measured to make evaluation in the same manner as in Example 1.

Results obtained are shown in Table 4.

EXAMPLE 6

A roll stamper was prepared in the same manner as in Example 5 except that the member 32 on the outside of the member 31 of the fixing member $3a$ was omitted so as for the fixing member $3a$ to have the same construction as that shown in FIG. 5. Using this roll stamper, molding was continuously carried out for 10 hours to form a substrate sheet for optical cards. Immediately thereafter, the surface temperature unevenness of the roll stamper and the area percentage thereof were measured to make evaluation in the same manner as in Example 5.

Results obtained are shown in Table 4.

TABLE 4

|  | Temperature unevenness | Area percentage |
| --- | --- | --- |
| Example 5 | AA | AA |
| Example 6 | AA | A |

What is claimed is:

1. A roll stamper for forming a substrate sheet for information recording mediums, comprising;
    a flexible stamper member having a pattern corresponding to a preformat for an information recording medium;
    a first fixing member and a second fixing member respectively joined to both ends of said stamper member in an integral form; and
    a pair of fit grooves capable of fittingly receiving said fixing members, formed in the periphery of a specular roll substrate in parallel to the axial direction of said specular roll substrate;
    said fixing members being so fitted to said fit grooves that said stamper member is fixed along the periphery of said specular roll substrate between said fit grooves;
    wherein;
    said first fixing member comprises a first member showing a coefficient of linear expansion substantially equal to the coefficient of linear expansion of said stamper member and a second member having a larger coefficient of linear expansion than the coefficient of linear expansion of said first member, said first member being joined to said stamper member and said second member being positioned inside said first member with respect to said second fixing member; and
    said roll stamper is so set up as to satisfy the relationship of expression (1):

$$\Delta L_1 - \Delta L_2 < \Delta L_{3a} \quad (1)$$

wherein, as elongation in the state said roll stamper is heated to the desired temperature, $\Delta L_1$ is an elongation of the length of said stamper member, $\Delta L_2$ is the sum of an elongation of the width of the second fixing member and an elongation of the distance between the fit grooves of said roll substrate, and $\Delta L_{3a}$ is an elongation of the width of said first fixing member toward the inside with respect to the second fixing member, from the part at which said stamper member is joined to said first fixing member.

2. The roll stamper according to claim 1, wherein said roll stamper is so set up as to satisfy the relationship of expression (2):

$$1 < \Delta L_{3a}/(\Delta L_1 - \Delta L_2) < 1.4 \quad (2)$$

wherein $\Delta L_1$, $\Delta L_2$ and $\Delta L_{3a}$ are as defined above.

3. The roll stamper according to claim 1, wherein the distance between the fit grooves of said roll substrate is substantially equal to the distance between the first and second fixing members joined to both ends of said stamper member.

4. The roll stamper according to claim 1, wherein $l_3/l_1$ is not less than 0.75 where $l_3$ is the distance between the fit grooves of said roll substrate and $l_1$ is the length of said stamper member.

5. The roll stamper according to claim 1, wherein said stamper member is formed of nickel.

6. The roll stamper according to claim 1, wherein said roll substrate has a coefficient of linear expansion of not more than $13 \times 10^{-6}$/°C.

7. The roll stamper according to claim 1, wherein said first member of the first fixing member is formed of a material having a Young's modulus of from $4 \times 10^3$ kg/m to $22 \times 10^3$ kg/mm².

8. The roll stamper according to claim 1, wherein said first member of the first fixing member has a Brinell hardness of from 5 to 500.

9. The roll 1 stamper according to claim 1, wherein said first member of the first fixing member has a cross-sectional area of from 30 mm² to 800 mm².

10. The roll stamper according to claim 1, wherein said second member of the first fixing member is formed of a material having a larger coefficient of linear expansion than a maximum value of the coefficient of linear expansion of said first member, said stamper member and said specular roll substrate each.

11. The roll stamper according to claim 10, wherein said second member of the first fixing member is formed of a material having a coefficient of linear expansion 1.3 times or more and 2.1 times or less a maximum value of the coefficient of linear expansion of said first member, said stamper member and said specular roll substrate each.

12. The roll stamper according to claim 11, wherein said second member of the first fixing member is formed of a material having a coefficient of linear expansion 1.4 times or more and 1.8 times or less a maximum value of the coefficient of linear expansion of said first member, said stamper member and said specular roll substrate each.

13. The roll stamper according to claim 1, wherein said second member of the first fixing member is formed of a material having a Young's modulus of from $4 \times 10^3$ kg/mm² to $22 \times 10^3$ kg/mm².

14. The roll stamper according to claim 1, wherein said second member of the first fixing member has a Brinell hardness of from 5 to 500.

15. The roll stamper according to claim 1, wherein said second member and said first member are fastened each other with a bolt.

16. The roll stamper according to claim 1, wherein said second member and said first member are bonded each other through an adhesive layer.

17. The roll stamper according to claim 1, wherein said first member is sandwiched between said second member and another second member.

18. The roll stamper according to claim 1, wherein the preformat pattern formed in the surface of said stamper member is a pattern corresponding to optical recording medium tracking groove or grooves in the form of a spiral or concentric circles with a groove width of 0.5 to 2 $\mu$m, a groove pitch of 1 to 5 $\mu$m and a groove depth of 200 to 5,000 Å.

19. The roll stamper according to claim 1, wherein the preformat pattern formed in the surface of said stamper member is a pattern corresponding to optical recording medium tracking grooves in the form of stripes with a groove width of 2 to 5 $\mu$m, a groove pitch of 8 to 15 $\mu$m and a groove depth of 200 to 5,000 Å.

20. The roll stamper according to claim 1, wherein at least one fixing member and fit groove of said first and second fixing members and said pair of fit grooves corresponding thereto each have a shape so made as to prevent the stamper member from separating from said specular roll substrate.

21. The roll stamper according to claim 20, wherein said fixing member and fit groove each have the shape of a trapezoid in their cross sections.

22. An apparatus for manufacturing a substrate sheet for information recording mediums, comprising a means for melt-extruding a resin to form a molten-resin sheet and a roll stamper having a pattern corresponding to a preformat formed in its surface, wherein;

said roll stamper comprises;

a flexible stamper member having a pattern corresponding to a preformat for an information recording medium;

a first fixing member and a second fixing member respectively joined to both ends of said stamper member in an integral form; and a pair of fit grooves capable of fittingly receiving said fixing members, formed in the periphery of a specular roll substrate in parallel to the axial direction of said specular roll substrate;

said fixing members being so fitted to said fit grooves that said stamper member is fixed along the periphery of said specular roll substrate between said fit grooves;

wherein;

said first fixing member comprises a first member showing a coefficient of linear expansion substantially equal to the coefficient of linear expansion of said stamper member and a second member having a larger coefficient of linear expansion than the coefficient of linear expansion of said first member, said first member being joined to said stamper member and said second member being positioned inside said first member with respect to said second fixing member; and said roll stamper is so set up as to satisfy the relationship of expression (1):

$$\Delta L_1 - \Delta L_2 < \Delta L_{3a} \tag{1}$$

wherein, as elongation in the state said roll stamper is heated to the desired temperature, $\Delta L_1$ is an elongation of the length of said stamper member, $\Delta L_2$ is the sum of an elongation of the width of the second fixing member and an elongation of the distance between the fit grooves of said roll substrate, and $\Delta L_{3a}$ is an elongation of the width of said first fixing member toward the inside with respect to the second fixing member, from the part at which said stamper member is joined to said first fixing member.

23. The apparatus for manufacturing a substrate sheet for information recording mediums according to claim 22, wherein said roll stamper is so set up as to satisfy the relationship of expression (2):

$$1 < \Delta L_{3a}/(\Delta L_1 - \Delta L_2) < 1.4 \tag{2}$$

wherein $\Delta L$, $\Delta L_2$ and $\Delta L_{3a}$ are as defined above.

24. The apparatus for manufacturing a substrate sheet for information recording mediums according to claim 22, wherein in said roll stamper the distance between the fit grooves of said roll substrate is substantially equal to the distance between the first and second fixing members joined to both ends of said stamper member.

25. The apparatus for manufacturing a substrate sheet for information recording mediums according to claim 22, wherein in said roll stamper $l_3/l_1$ is not less than 0.75 where $l_3$ is the distance between the fit grooves of said roll substrate and $l_1$ is the length of said stamper member.

26. The apparatus for manufacturing a substrate sheet for information recording mediums according to claim 22, wherein in said roll stamper said stamper member is formed of nickel.

27. The apparatus for manufacturing a substrate sheet for information recording mediums according to claim 22, wherein in said roll stamper said roll substrate has a coefficient of linear expansion of not more than $13 \times 10^{-6}/°C$.

28. The roll stamper according to claim 1, wherein said roll stamper is so set up as to satisfy the relationship of expression (3):

$$(\Delta L_1 - \Delta L_2) < \Delta L'_{31} \tag{3}$$

wherein $\Delta L_1$ and $\Delta L_2$ are as defined above, and $\Delta L'_{31}$ is an elongation due to thermal expansion, of the width at which the first member of the first fixing member overlaps with the flexible stamper member.

* * * * *

UNITED STATES PATENT AND TRADEMARK OFFICE
CERTIFICATE OF CORRECTION

PATENT NO. : 5,320,514
DATED : June 14, 1994
INVENTOR(S) : Kanome et al.

It is certified that error appears in the above-indentified patent and that said Letters Patent is hereby corrected as shown below:

On the title page:

[57] ABSTRACT:

Line 18, "having" should read --has--.

COLUMN 1:

Line 25, "a" should be deleted.
Line 45, "searches" should read --search-- and "have" should read --has--.
Line 48, "extrusion," should read --extrusion--.
Line 65, "for" should read --for a--.

COLUMN 2:

Line 10, "to cause" should read --and causing--.
Line 35, "well stand" should read --stand up well--.
Line 42, "having" should be deleted.

COLUMN 3:

Line 1, "mediums," should read --mediums--.

COLUMN 4:

Line 66, "$\neq L_{3a}$" should read --$L_{3a}$--.

COLUMN 5:

Line 20, "in a" should read --with--.

UNITED STATES PATENT AND TRADEMARK OFFICE
CERTIFICATE OF CORRECTION

PATENT NO. : 5,320,514
DATED : June 14, 1994
INVENTOR(S) : Kanome et al.

It is certified that error appears in the above-indentified patent and that said Letters Patent is hereby corrected as shown below:

COLUMN 6:

Line 6, "is" should read --are--.
Line 15, "line B-B'" should read --line 1B-1B'--.

COLUMN 7:

Line 9, "23" should read --$l_3$--.
Line 30, "no" should read --any--.
Line 42, "the" (second occurrence) should be deleted.
Line 56, "bend" should read --bending--.

COLUMN 8:

Line 1, "member" should read --member,--.
Line 13, "each," should read --each--.
Line 14, "2," should read --2--.
Line 51, "more small-sized," should read --smaller,--.
Line 52, "bend" should read --bending--.

COLUMN 9:

Line 3, "in a" should read --with-- and "a" (first occurrence) should be deleted.
Line 4, "productivity;" should read --productivity.--.
Line 18, "(roll" should read --{roll-- and "-25°C)." should read -- -25°C}.--.
Line 59, "4.2x10 kg/mm$^2$" should read --4.2X10$^3$ kg/mm$^2$--.

COLUMN 10:

Line 58, "to" (first occurrence) should read --and--.

UNITED STATES PATENT AND TRADEMARK OFFICE
CERTIFICATE OF CORRECTION

PATENT NO. : 5,320,514  
DATED : June 14, 1994  
INVENTOR(S) : Kanome et al.

Page 3 of 6

It is certified that error appears in the above-indentified patent and that said Letters Patent is hereby corrected as shown below:

Line 64, "to" should read --to an-- and "or" should read --or an--.
Line 68, "to" should read --to an--.

COLUMN 11:

Line 1, "or" should read --or an--.
Line 64, "Thus" should read --Thus,--.

COLUMN 12:

Line 15, "Thus" should read --Thus,--.
Line 21, "in a" should read --with--.
Line 56, "Thus" should read --Thus,--.

COLUMN 13:

Line 3, "ingly" should read --ite--.
Line 17, "a well close" should read --close enough--.
Line 28, "in a" should read --with--.
Line 55, "broad" should read --wide--.
Line 67, "broad," should read --wide,--.

COLUMN 14:

Line 16, "broad" should read --wide--.
Line 19, "jointed" should read --joined-- and "its" should be deleted.
Line 20, "its" should read --the--.
Line 27, "e" should read --a--.
Line 32, "were each" should read --each were--.
Line 38, "member" should read --member 1--.

UNITED STATES PATENT AND TRADEMARK OFFICE
CERTIFICATE OF CORRECTION

PATENT NO. : 5,320,514

DATED : June 14, 1994

INVENTOR(S) : Kanome et al.

Page 4 of 6

It is certified that error appears in the above-indentified patent and that said Letters Patent is hereby corrected as shown below:

Line 40, "members 3e" should read --members 3a-- and "3b" should read --3b to--.
   Line 41, "its" should be deleted.
   Line 48, "3e" should read --3a--.
   Line 58, "as" should read --in--.

COLUMN 15:

Line 27, "Thus" should read --Thus,--.
   Line 28, "in" should read --with--.
   Line 36, "in a" should read --with--.
   Line 43, "as" (first occurrence) should be deleted, and "as 10°C" should read --(10°C--.
   Line 44, "mum" should read --mum).

COLUMN 16:

Line 4, "end" should read --and--.
   Line 25, "criterions." should read --criterion.--.
   Line 43, "so as for" should read --until--.
   Line 44, "to come to be" should read --reached--.
   Line 45, "0,143 mm" should read --0.143 mm--.
   Line 46, "0,140 mm," should read --0.140 mm,--.
   Line 47, "Subsequently" should read --Subsequently,--.
   Line 53, "25" should be deleted.

COLUMN 18:

Line 4, "the" (second occurrence) should read --said--.
   Line 5, "the" (second occurrence) should read --said--.
   Line 8, "the" should read --said--.

UNITED STATES PATENT AND TRADEMARK OFFICE
CERTIFICATE OF CORRECTION

PATENT NO. : 5,320,514

DATED : June 14, 1994

INVENTOR(S) : Kanome et al.

Page 5 of 6

It is certified that error appears in the above-indentified patent and that said Letters Patent is hereby corrected as shown below:

Line 18, "the" should read --said--.
Line 19, "the" (second occurrence) should read --said--.
Line 24, "the" (first occurrence) should read --said--.
Line 32, "the" should read --said--.
Line 36, "the" should read --said--.
Line 38, "1" (first occurrence) should be deleted.
Line 39, "the" should read --said--.
Line 42, "the" should read --said--.
Line 49, "the" should read --said--.
Line 56, "the" should read --said--.
Line 63, "the" should read --said--.
Line 67, "the" should read --said--.

COLUMN 19:

Line 2, "fastened" should read --fastened to--.
Line 5, "bonded" should read --bonded to--.
Line 12, "to" should read --to an--.
Line 27, "the" should read --said--.

COLUMN 20:

Line 13, "the" (second occurrence) should read --said--.
Line 14, "the" (second occurrence) should read --said--.
Line 17, "the" should read --said--.
Line 30, "the" should read --said--.
Line 31, "the" (second occurrence) should read --said--.
Line 26, "$\Delta L,$" should read --$\Delta L_1,$--.

UNITED STATES PATENT AND TRADEMARK OFFICE
CERTIFICATE OF CORRECTION

PATENT NO. : 5,320,514
DATED : June 14, 1994
INVENTOR(S) : Kanome et al.

It is certified that error appears in the above-indentified patent and that said Letters Patent is hereby corrected as shown below:

Line 36, "the" (second occurrence) should read --said--.
Line 52, "$(\Delta L_1 - \Delta L_2) < \Delta L'_{31}$" should read --$(\Delta L_1 - \Delta L_2) > \Delta L'_{31}$--.
Line 55, "expansion," should read --expansion--.
Line 56, "the" (both occurrences) should read --said--.
Line 57, "the" should read --said--.

Signed and Sealed this

Seventh Day of February, 1995

BRUCE LEHMAN

Attest:

*Attesting Officer*

*Commissioner of Patents and Trademarks*